United States Patent [19]

Breu

[11] Patent Number: 4,579,365

[45] Date of Patent: Apr. 1, 1986

[54] TRAILER COUPLING

[75] Inventor: Johann Breu, Munich, Fed. Rep. of Germany

[73] Assignee: Rockinger Spezialfabrik für Anhängerkupplungen GmbH & Co.

[21] Appl. No.: 688,577

[22] Filed: Jan. 3, 1985

[30] Foreign Application Priority Data

Jan. 11, 1984 [DE] Fed. Rep. of Germany ....... 3400707

[51] Int. Cl.$^4$ .............................................. B60D 1/02
[52] U.S. Cl. ................................... 280/507; 280/508; 280/515; 403/316
[58] Field of Search ............... 280/504, 507, 508, 509, 280/510, 515; 403/316

[56] References Cited

U.S. PATENT DOCUMENTS 1,837,940  12/1931  Ade ..................................... 280/508

FOREIGN PATENT DOCUMENTS 38853     8/1965  Fed. Rep. of Germany ...... 280/508
2458977   2/1979  Fed. Rep. of Germany ...... 280/508
901082    1/1982  U.S.S.R. ........................... 280/515

Primary Examiner—David M. Mitchell
Assistant Examiner—Everett G. Diederiks, Jr.
Attorney, Agent, or Firm—Toren, McGeady, Stanger, Goldberg & Kiel

[57] ABSTRACT

In a trailer coupling having two independently effective securing arrangements, of which the one is formed by an opener lever and the other by a securing bolt, the opener lever engages in an upwardly partially open slot of the coupling bolt and is reinforced by a disengaging cam which emerges upwards from the slot and co-operates with the securing bolt in the direction of its disengagement.

6 Claims, 20 Drawing Figures

TRAILER COUPLING

The invention relates to a trailer coupling including a coupling body with a coupling bolt guided in the coupling body for displacement between a coupling position and a non-coupling position. An opener lever is pivotally displaceable between a securing position and a holding position and is engageable in an aperture in the coupling bolt. The opener lever secures the coupling bolt in the coupling position. The opener lever can displace the coupling bolt out of the coupling position. An additional securing bolt can hold the coupling bolt in the coupling position. A disengaging cam is arranged to displace the additional securing bolt out of its securing position. The disengaging cam is connected with the opener lever for common rotation and for at least partially displacing the additional securing bolt.

Such a trailer coupling is known from public prior use of a trailer coupling Type SU 06 of the firm ADE of Offenburg in the year 1956. In the known form of embodiment the aperture in the coupling bolt is upwardly closed and the release cam is spatially separated from the opener lever. Thus the release cam cannot contribute to the rigidity of the opener lever.

The invention is based upon the problem of indicating a solution in which the release cam at the same time brings a stiffening of the opener lever. The significance of this task is readily visible if one considers that the opener lever has occasionally to transmit considerable forces, especially if the coupling bolt jams for any reason, but that on the other hand the aperture of the coupling bolt for the reception of the securing lever cannot be arbitrarily enlarged with regard to the stressing of the coupling bolt.

This problem is solved by providing a slot in the upper end of the coupling bolt. An entraining peg on the upper end of the coupling bolt extends into the slot. The disengaging cam is formed on the opener lever and is located within the slot. The bottom of the slot forms a stop face for the additional securing bolt.

Regarding prior art, mention should also be made of a solution known from Fed. German Pub. Sp. No. 2,458,977 in which the opener lever (lifting tongue) and an operating lever co-operating with the additional indicator bolt form a fork. In this case the opener lever engages in an upwardly closed passage of the coupling bolt while the operating arm rests on the upper end face of the coupling bolt and in doing so fulfills a hold-down function. The additional indicator bolting in this case does not rest directly against the coupling bolt, but only indirectly through a dome of the operating arm. It is therefore not impossible that, after an assumed elimination of the securing of the coupling bolt by the opener lever, an additional securing by the additional indicator bolt is eliminated, in that the operating arm, perhaps in the case of an upwardly directed acceleration of the coupling bolt, shifts the additional indicator bolt aside out of its securing position. Furthermore in the case of this solution the overall height of the coupling is undesirably increased by the operating arm resting on the upper end of the coupling bolt. Especially when the coupling bolt is in the non-coupling position in fact the operating arm protrudes considerably upwards beyond the upper end of the coupling bolt. Finally also in the case of this known form of embodiment the operating arm is separated from the opener lever (lifting tongue) as a result of the forking, in such a way that the operating arm cannot contribute to a stiffening of the opener lever.

In the case of the solution according to the invention the opener lever is stiffened by the release cam, without need, in regard to this stiffening, for a harmful enlargement of the aperture in the coupling bolt.

It is not necessary for the release cam to release the additional securing bolt completely and hold it released. Rather this task, even after initiation of the release movement by the release cam has once taken place, can be taken over by the coupling bolt itself. It is however important that the additional securing bolt cannot be released over its entire release distance by the coupling bolt, since the independent securing function could be impaired. Therefore it is necessary that the release movement of the additional securing bolt can be initiated only by the release cam.

The solution according to the invention is usable in combination with remote control equipment. In that case the transmission means for the coupling actuation can act at any desired point, especially upon an actuating shaft or a special remote control arm of the actuating shaft. In the case of remote control it is frequently desired to introduce a remote indication too. By way of example a solution is conceivable for the remote indication. In the case of this solution an indication is supplied to the driver in the driving cabin as to whether the additional securing bolt is situated in the securing position. Such an indication implies that the coupling bolt is situated in the coupling position, because the additional securing bolt can move into the securing position only when the coupling bolt is in the coupling position.

The formation according to the invention is usable in combination with various forms of embodiment of automatic coupling systems, for example in combination with forms of embodiment where the opener lever is seated directly on an actuating shaft with actuating handle. It is however also conceivable to use the solution according to the invention in combination with an automatic system where the opener lever is subject to the action of an entraining and support lever which in turn is seated on the actuating shaft.

The invention is explained by reference to examples of embodiment by the accompanying Figures, wherein.

Figure 1:
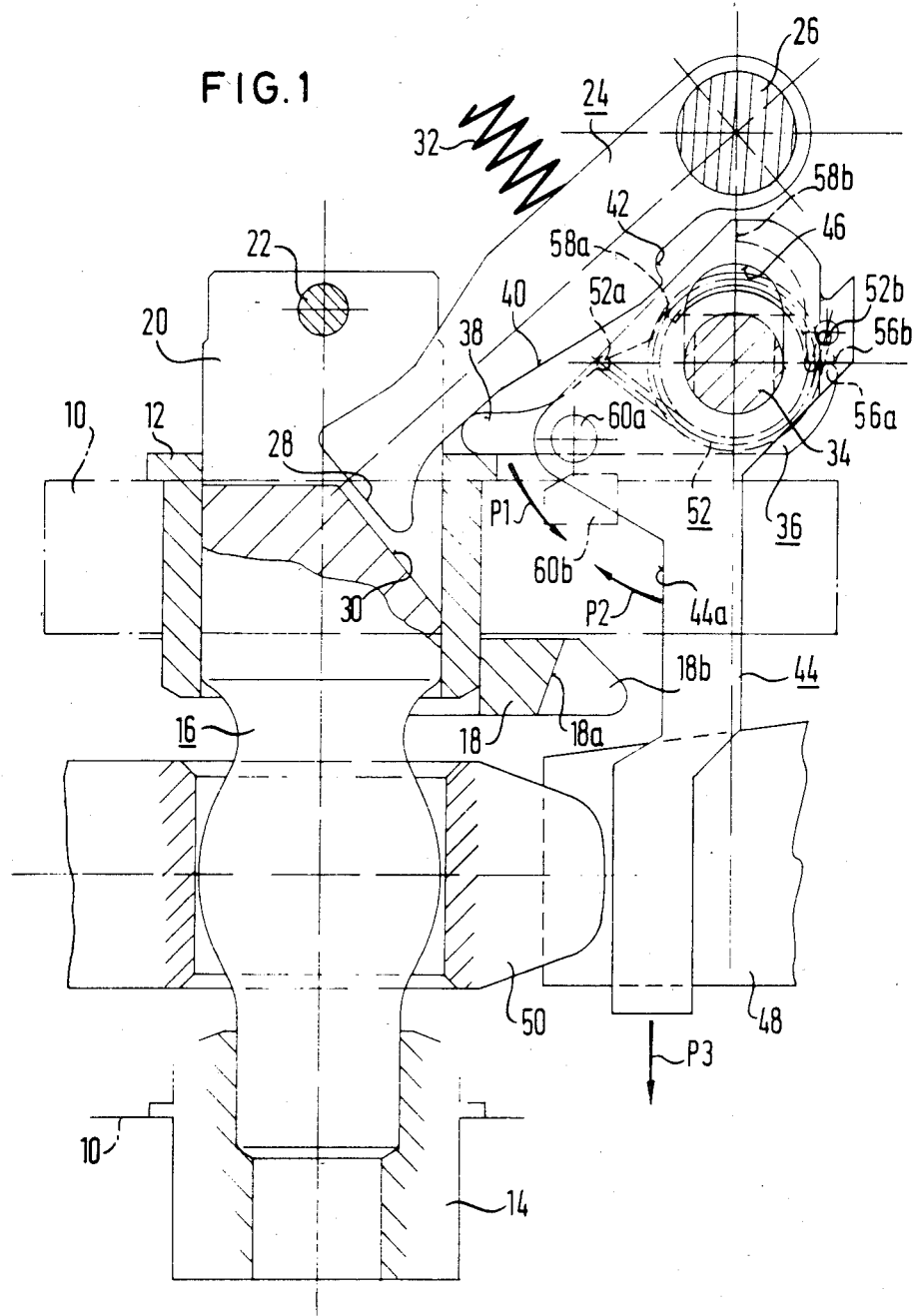
FIGS. 1 to 12 represent the different operational states of a trailer coupling in which the invention is applicable.

In FIG. 1 the coupling body is designated by 10. This coupling body 10 comprises guide bushes 12 and 14 for a coupling bolt 16. The coupling body 10 carries the coupling mouth, of which only the upper lug 18 is entered. In FIG. 1 the coupling bolt 16 is situated in the coupling position. At the upper end the coupling bolt 16 is provided with a slot 20, which is bridged over by a lifter bolt 22. In the slot 20 there engages an opener lever 24 which is mounted rotatably on an opener lever pivot spindle 26 arranged in the coupling body. The opener lever 24 stands with its free end 28 opposite to a ramp 30 of the slot bottom, so that the coupling bolt 16 is secured in the coupling position as illustrated by the opener lever 24. The opener lever 24 is initially stressed into its securing position as illustrated in FIG. 1 by a diagrammatically indicated first spring 32.

An actuating shaft 34 is further rotatably mounted in the coupling body. A support lever 36 having an entraining and support tip 38 is non-rotatably seated on this actuating shaft 34. The entraining and support tip 38 lies against an entraining edge 40 of the opener lever 24 and can snap into a support detent 42 of the opener lever 24.

A release lever 44 is mounted displaceably by means of a slot 46 and pivotably on the actuating shaft 34. The lower end of the release lever 44 is arranged between two stop jaws 48 for a towing eye 50 and stands opposite to the towing eye 50 at its end which enters the coupling body. A torsion spring 52, which is wound around the actuating shaft 34 or a hub of the support lever 36 and is rotatable in relation to the actuating shaft 34, is supported with its one end 52a on the support lever 36 and acts with its other end 52b on the release lever 44. This torsion spring seeks to bring the support lever 36 and the release lever 44 nearer to one another in the direction of the rotation arrows P1, P2. Furthermore it seeks to shift the release lever 44 with its slot 46 downwards in the direction of the displacement arrow P3 in relation to the actuating shaft 34. In FIG. 1 the entraining and support tip 38 of the support lever 36 is resting on the bush 12 and the opener lever 24 is lying with its entraining edge 40 on the entraining and support tip 38. The release lever 44 is held fast in the position in displacement and rotation as entered in FIG. 1, against the action of the torsion spring 52, due to the fact that an entraining stop 56a of the support lever 36 rests on an entraining stop 56b of the release lever 44.

On the support lever 36 there is fitted a release moment transmission stop 58a which can co-operate with a release moment transmission stop 58b of the release lever 44.

On the support lever 36 there is further fitted a control stop 60a which can co-operate with a control stop 60b of the coupling body.

It should be noted that according to FIG. 1 the control stops 60a and 60b are at a certain distance from one another, so that the driving in of the towing eye 50 beyond a predetermined position, for example as a result of wear of the towing eye 50 or of the stop jaws 48, does not lead to a destructive action upon the release lever 44 but the latter can deviate to the right in FIG. 1.

Figure 2:
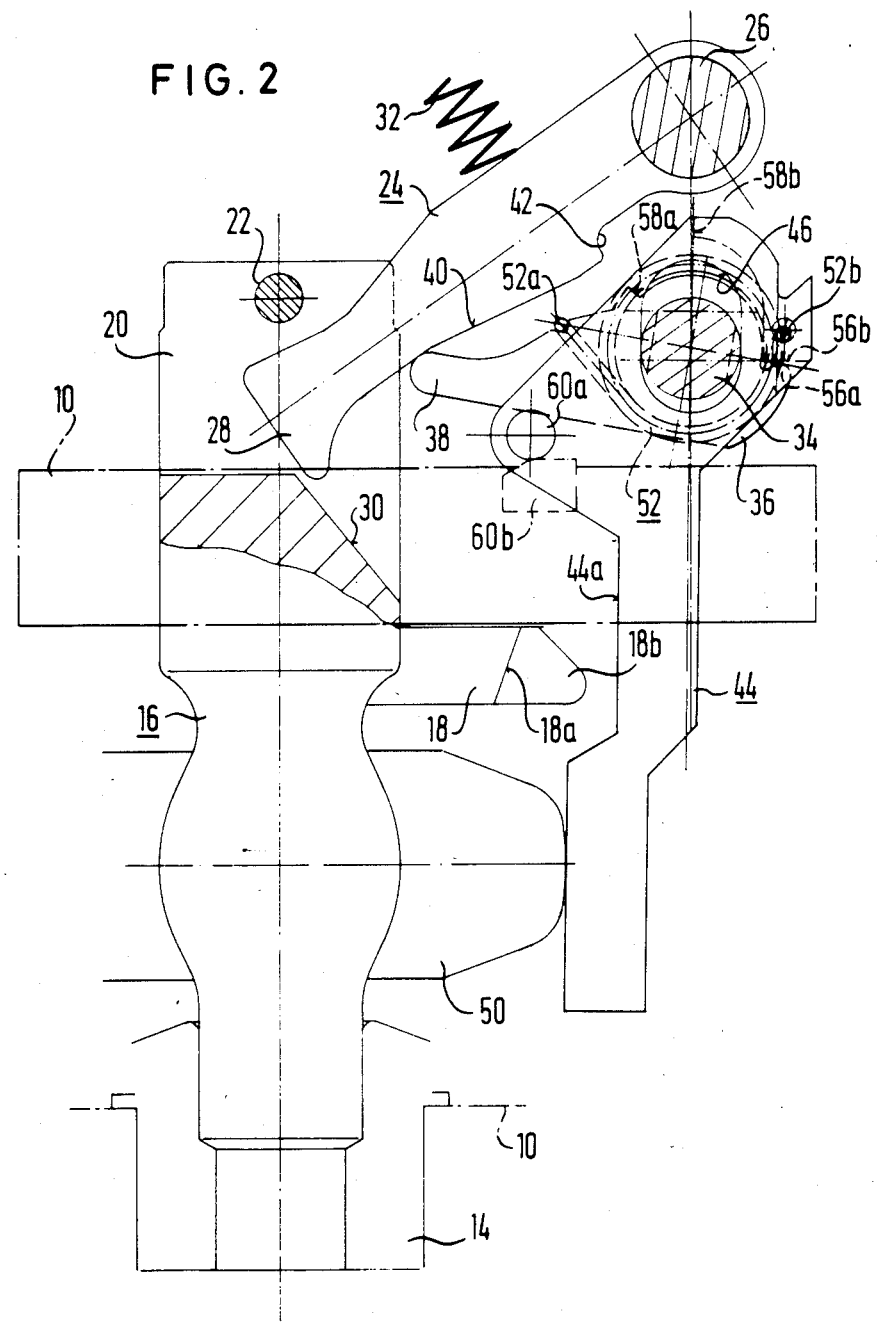
Figure 3:
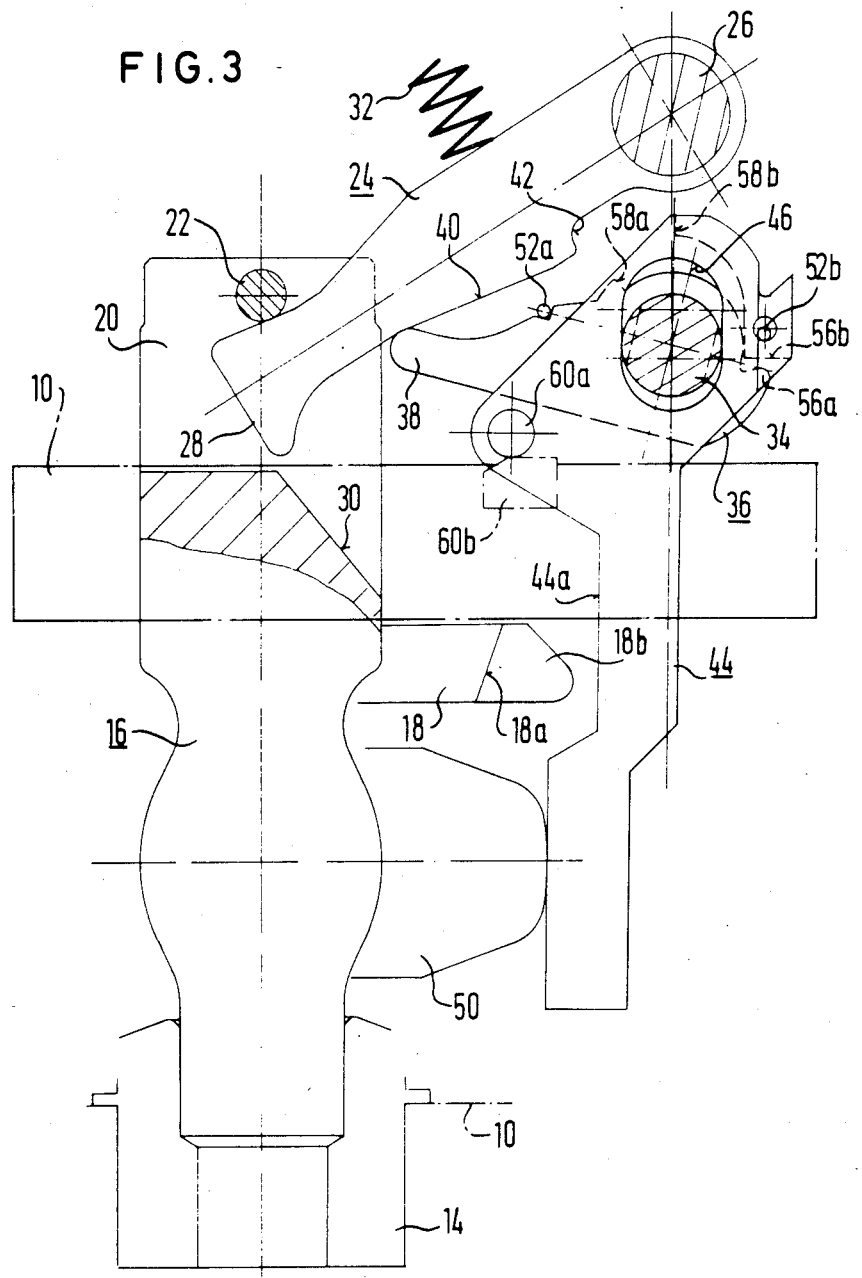
Figure 4:
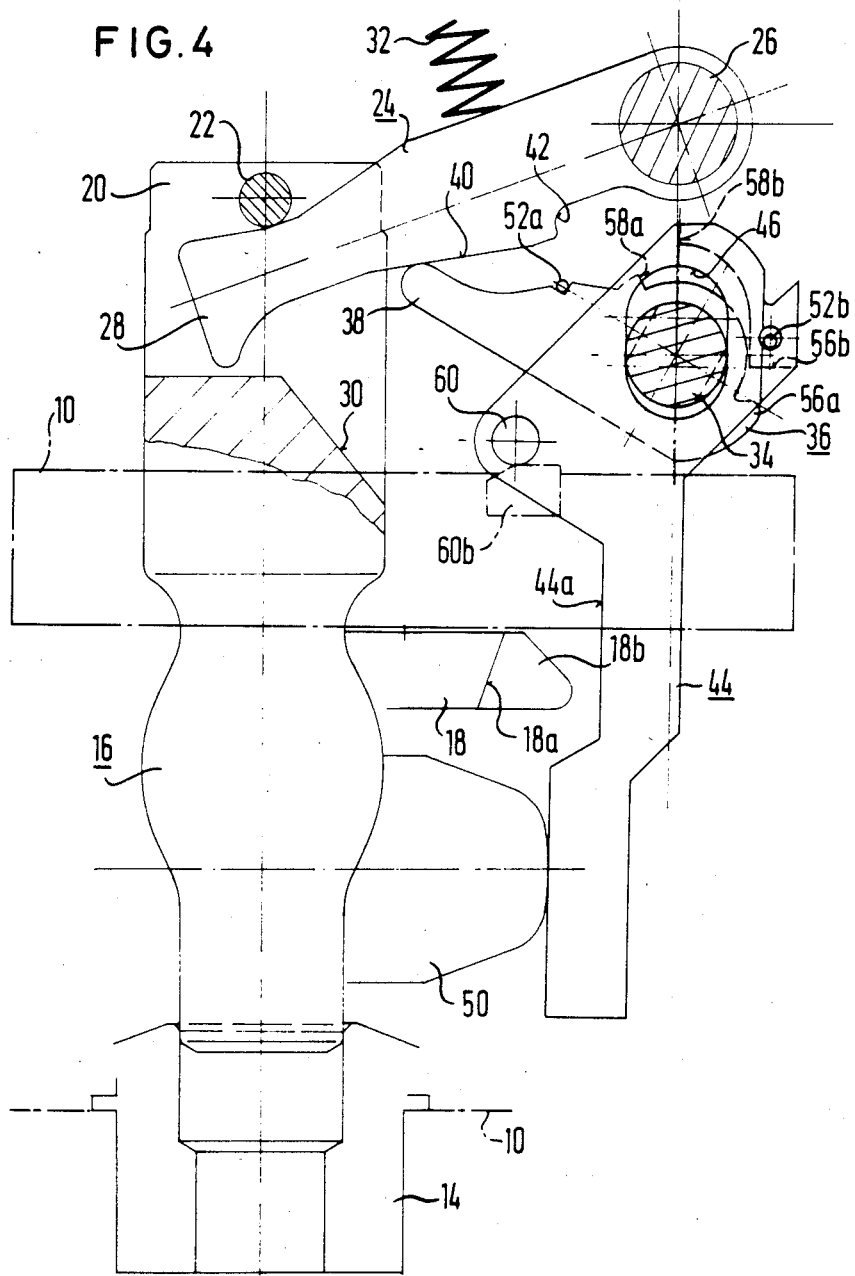
Figure 5:
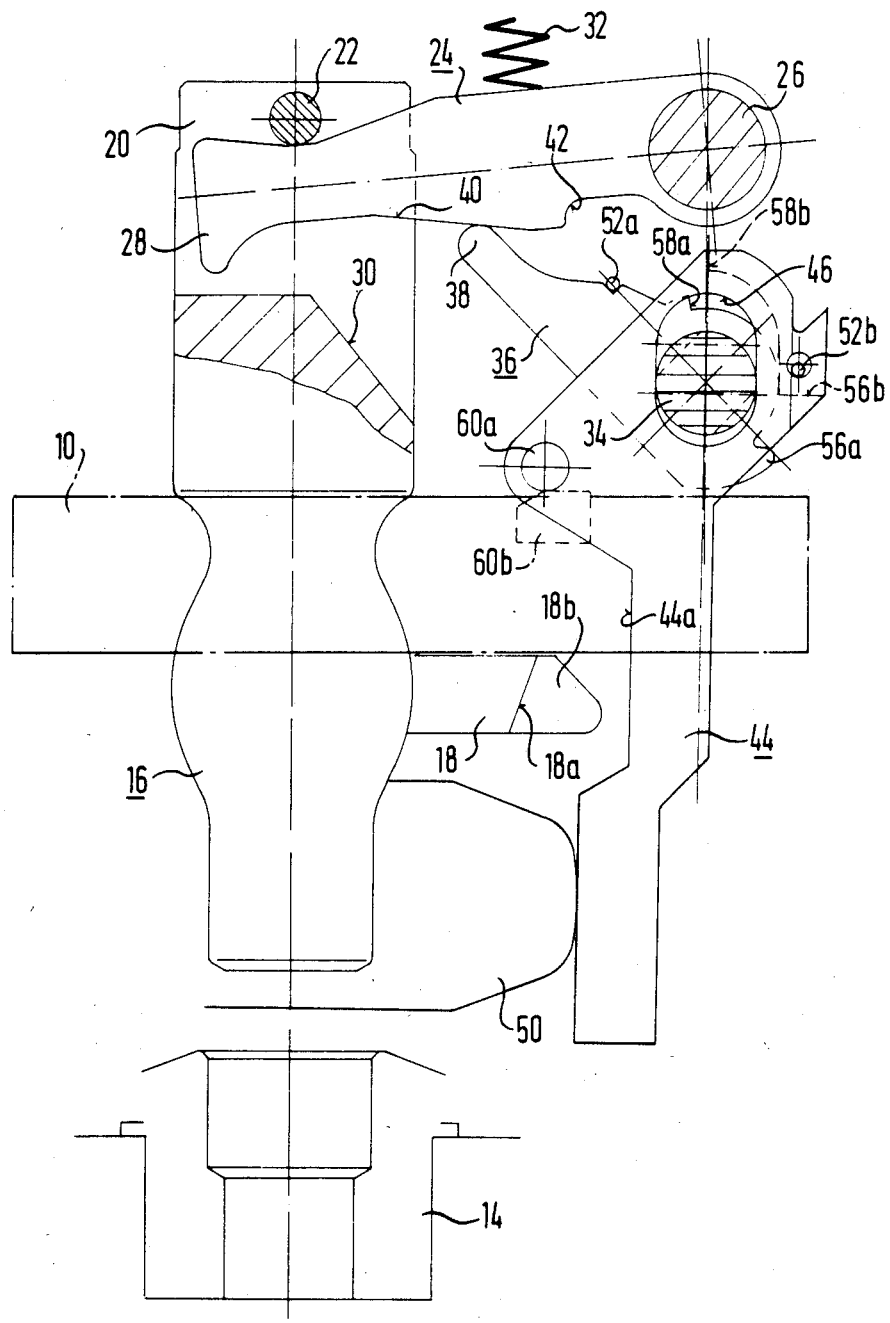
Figure 6:
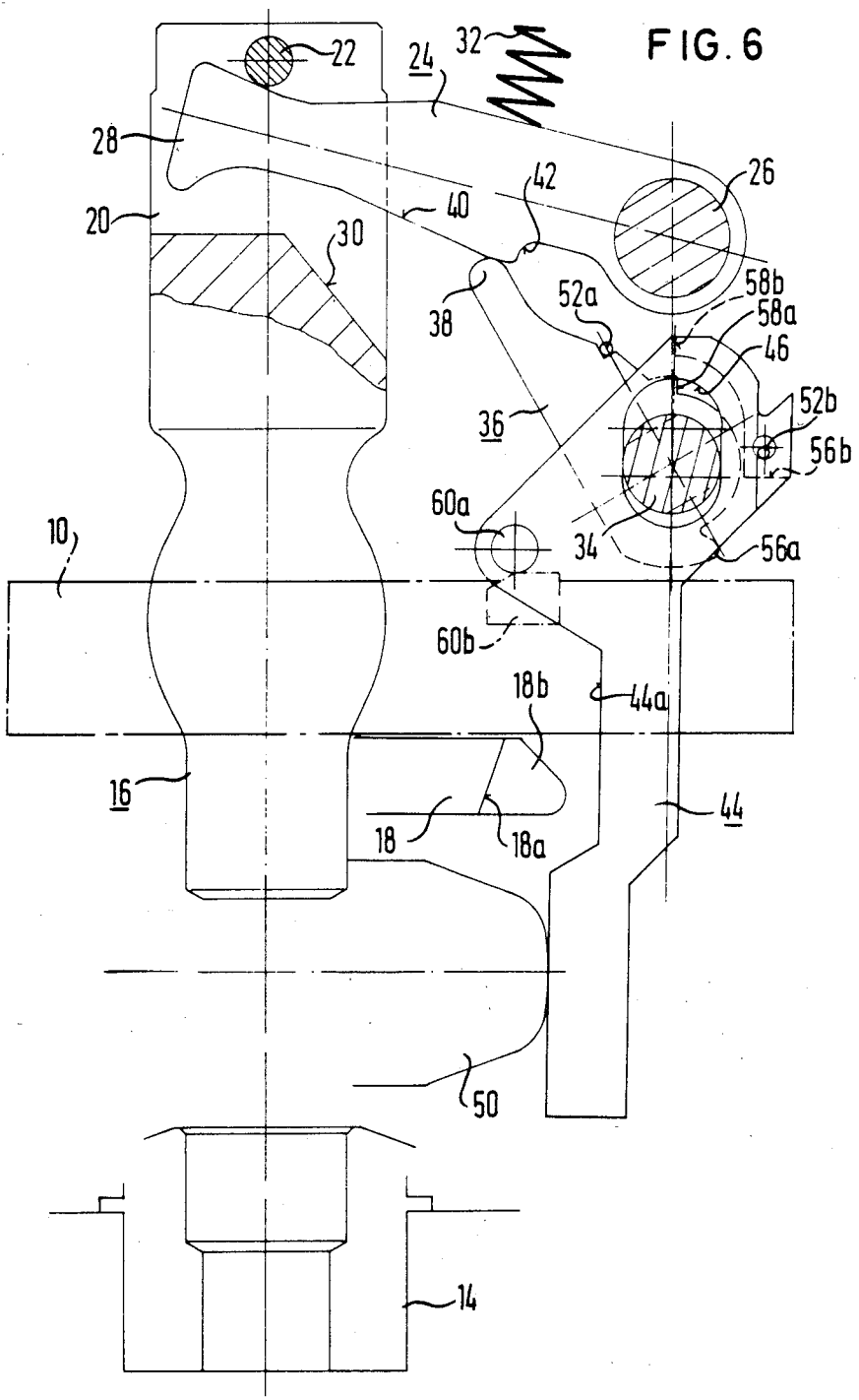

In FIG. 2 the actuating shaft 34 has been rotated in the clockwise direction in comparison with FIG. 1, by manual action, so that the entraining and support tip 38 has begun to turn the opener lever 24 likewise in the clockwise direction. The entraining stop 56b has followed the entraining stop 56a downwards, so that the release lever 44 has likewise rotated in the clockwise direction and shifted downwards, the control stop 60a has driven against the control stop 60b and the release lever 44 against the towing eye 50. The position of the release lever 44 thus reached is called the first operational position, while the position of the release lever 44 according to FIG. 1 is called the third operational position.

Figure 7:
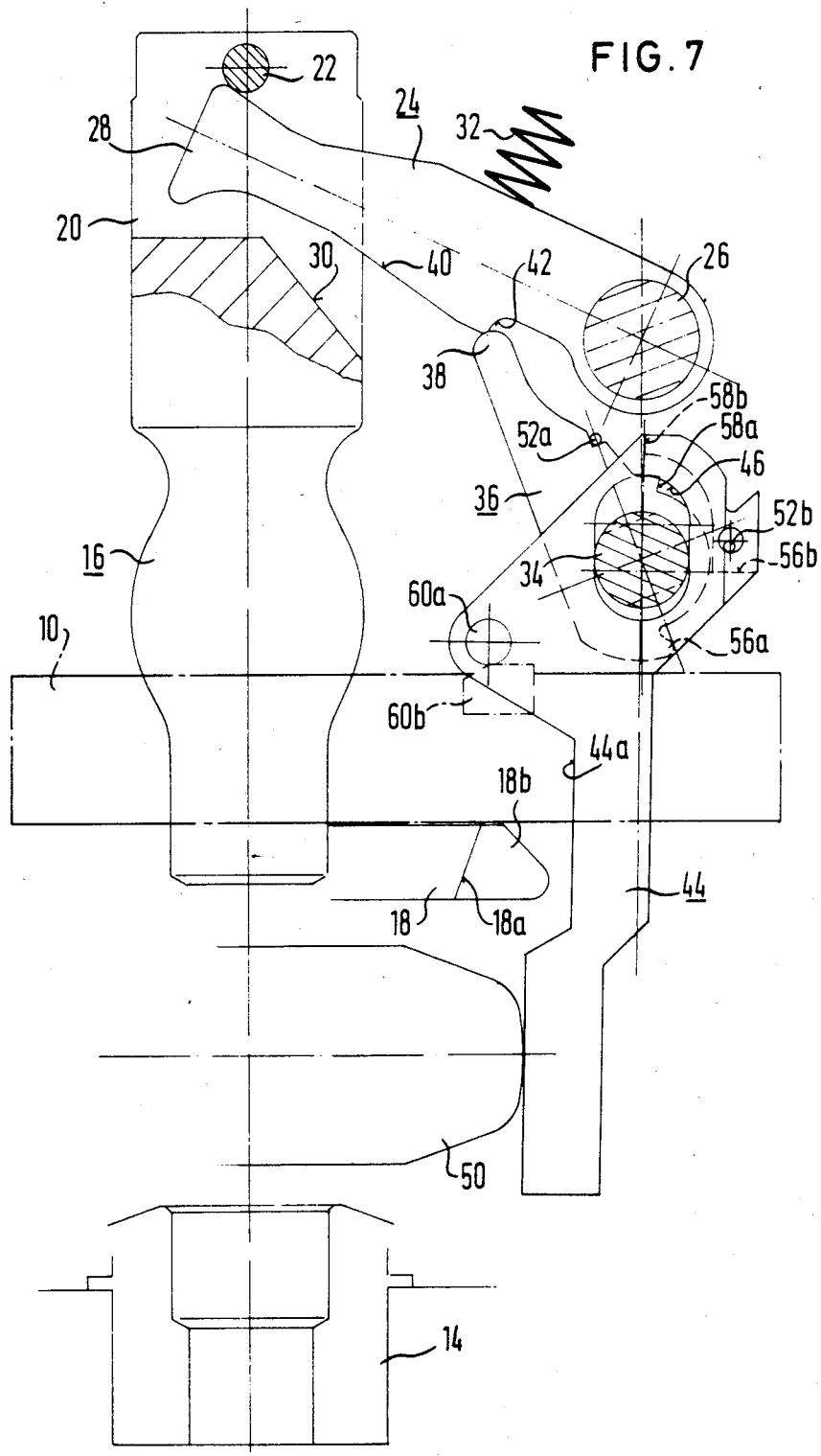

In FIGS. 3 to 7 the support lever 36 has been rotated one step further in the clockwise direction from each Figure to the next; accordingly the opener lever 24 has also been rotated further in the clockwise direction, has departed from the securing position from the ramp 30 and by means of the lifter bolt 22 has lifted the coupling bolt 16 upwards out of its coupling position according to FIG. 1, the non-coupling position of the coupling bolt 16, in which the towing eye 50 can move in and out, having been reached in FIG. 7. The position of the release lever (first operational position) has remained unchanged and is still determined by the abutment of the release lever 44 on the towing eye 50 and by the abutment of the control stops 60a, 60b on one another.

Figure 8:
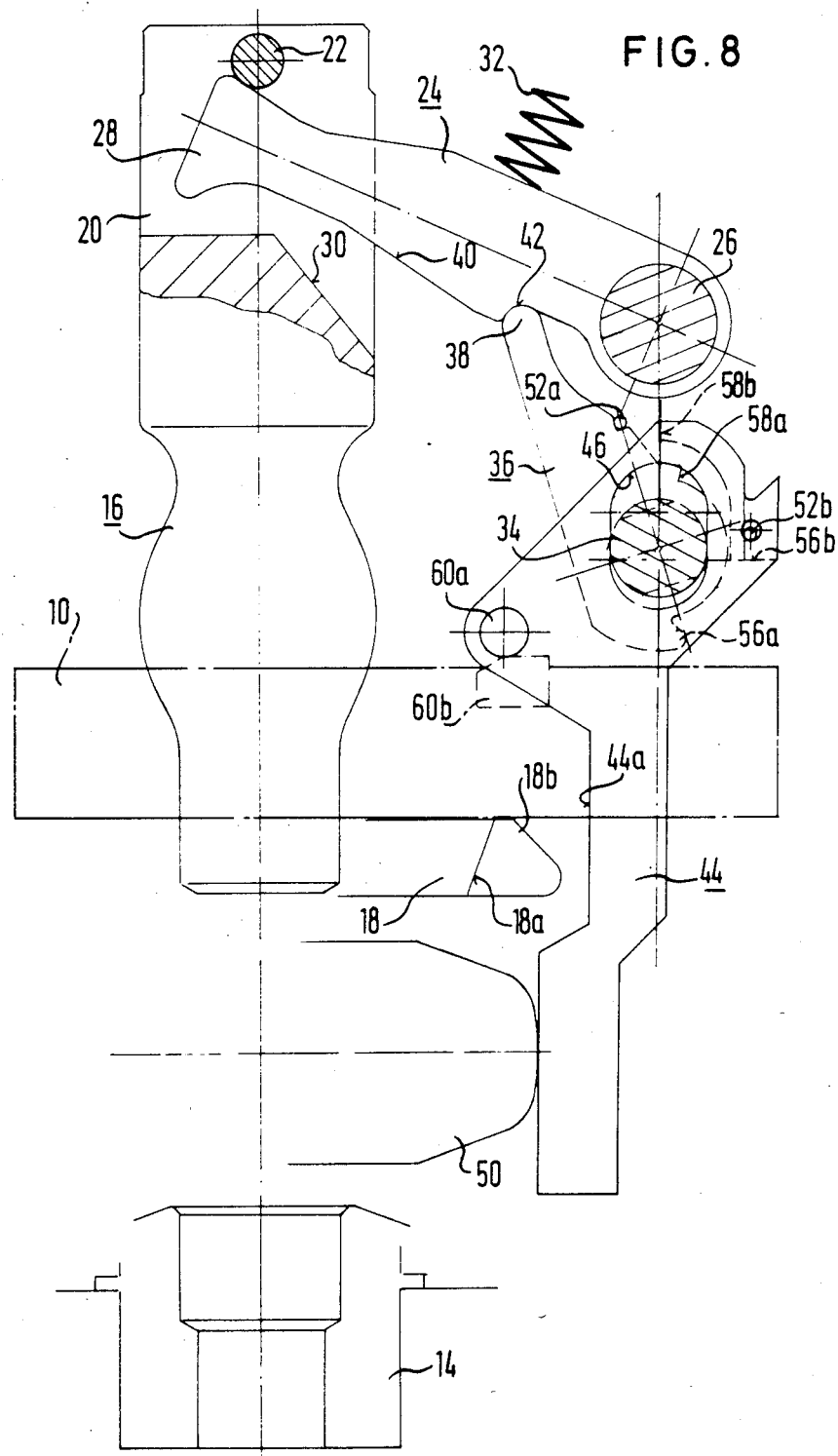

In FIG. 8 the entraining and support tip 38 of the support lever 34 has entered the support notch 42 of the opener lever 24. The opener lever 24 now remains in the holding position as illustrated in FIG. 8, due to the support lever 36 situated in the support position, even if no external moment is acting any longer upon the actuating shaft 34. Even in FIG. 8 the release lever 44 is still occupying its first operational position. In FIG. 8 that operational condition is reached in which the towing eye can come out of the coupling, perhaps by forward motion of the towing vehicle in relation to the trailer.

Figure 9:
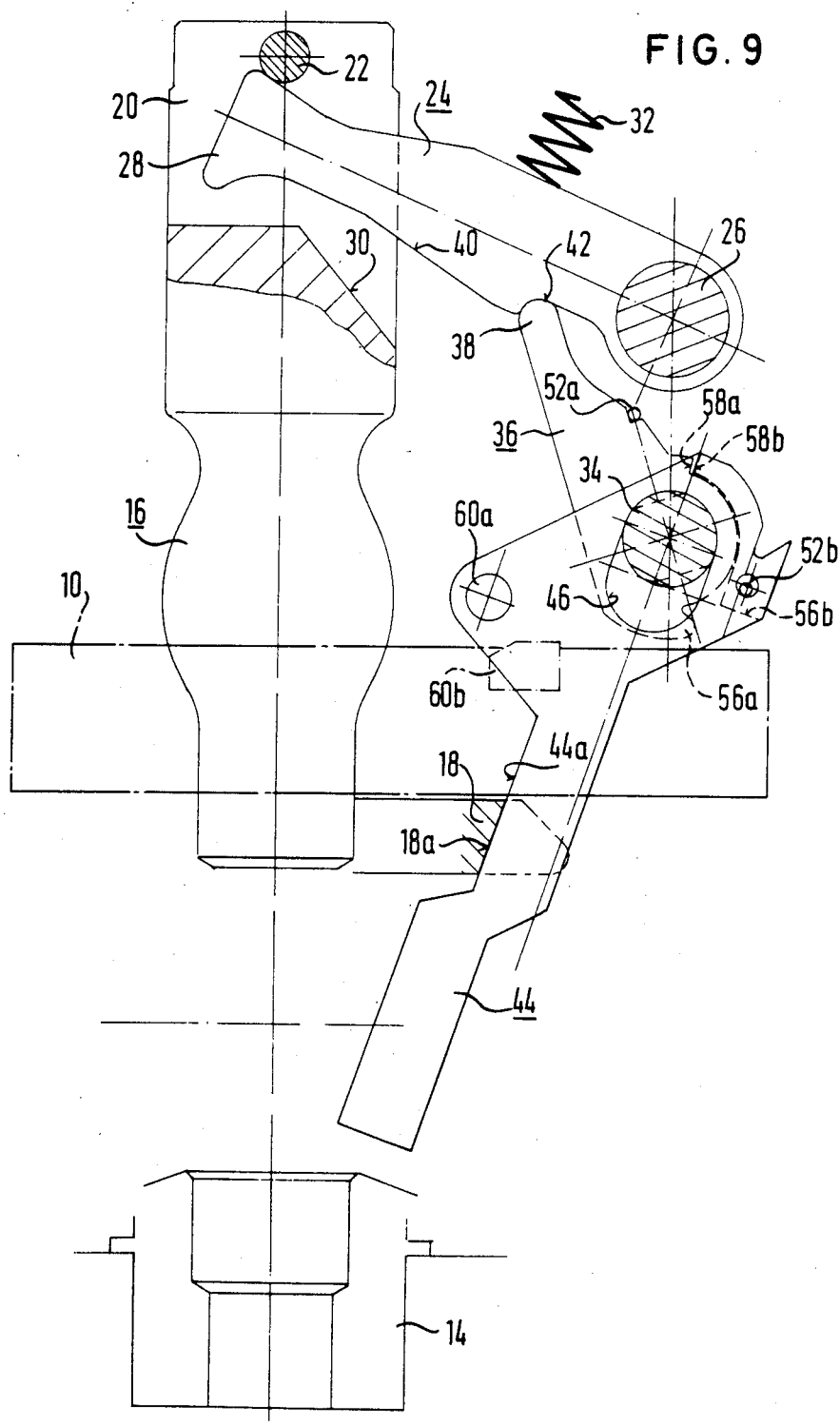

In FIG. 9 the towing eye 50 has been driven out of the coupling body; the release lever 44 has lost its support on the towing eye and has moved under the action of the torsion spring 52 into the operational position as represented in FIG. 9, in which it rests with the upper end of the slot 46 on the actuating shaft 34 and with an edge 44a on a stop face 18a of the coupling mouth. This stop face 18a forms the bottom of a slot 18b in the upper lug 18 of the entry mouth so that the entry mouth, after the removal of the towing eye, is blocked by the release lever against twisting about the axis of the coupling bolt 16. The release moment transmission stop 58b of the release lever 44 is now situated in the engagement readiness position opposite to the release moment transmission stop 58a of the support lever 36. This position of the release lever 44 is designated as its second operational position. The opener lever 24 is still supported as before by the support lever 36 in its holding position, so that the coupling bolt 16 is still situated in its non-coupling position.

Figure 10:
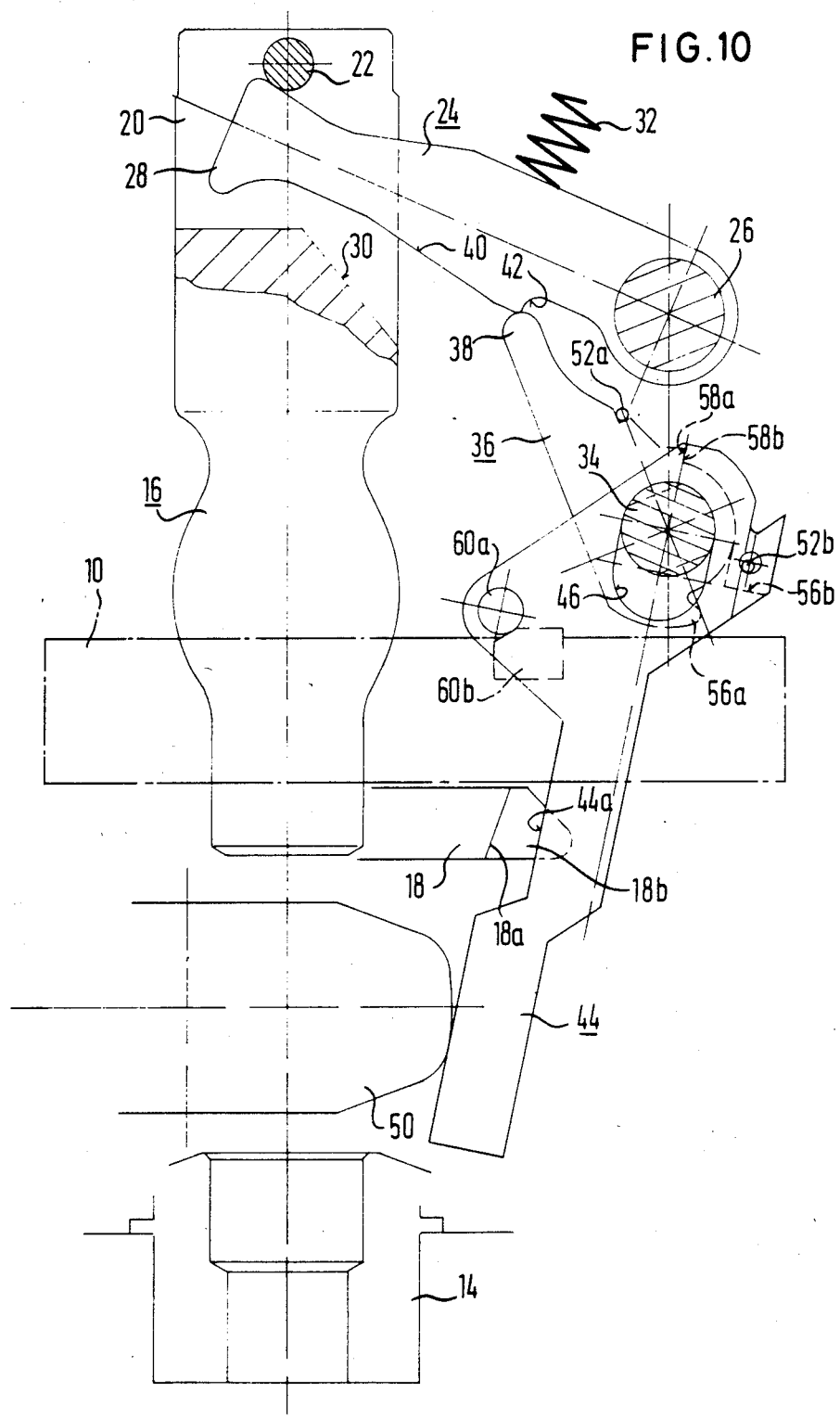
Figure 11:
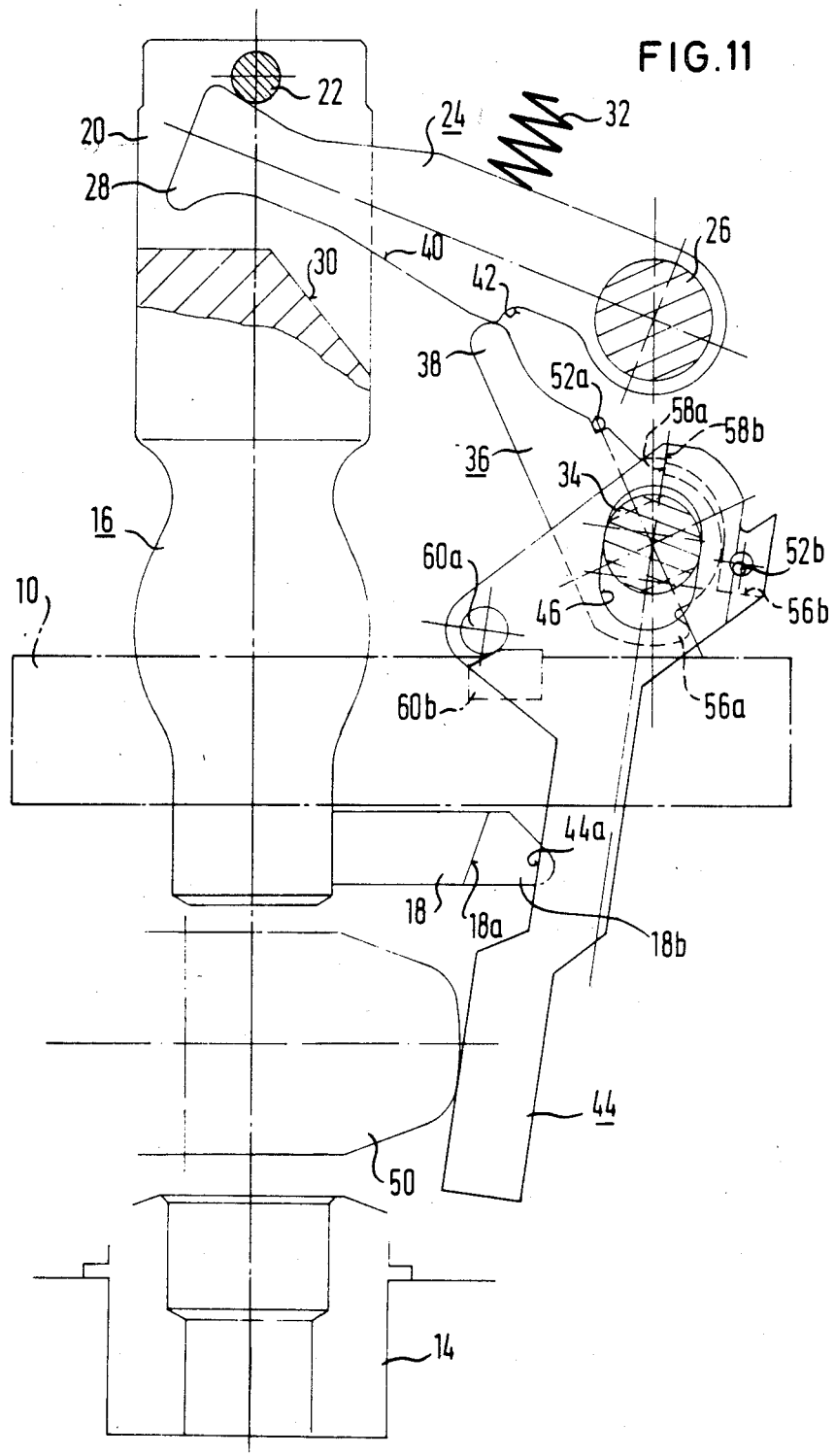

According to FIG. 10 the towing eye 50 is just beginning to drive into the coupling body. Here the release lever 44 has already been pivoted, compared with the situation according to FIG. 9, so far about the actuating shaft 34 that the control stop 60a has come against the control stop 60b. Here the support lever 36 has been pivoted by the release moment transmission stops 58a and 58b in the counter-clockwise direction so far that the entraining and support tip 38 has moved out of the support notch 42. According to FIG. 11 by further driving in of the towing eye 50 the release lever 44 has been pivoted further in the counter-clockwise direction about the actuating shaft 34 and at the same time shifted with its slot 46 upwards in relation to the actuating shaft 34, whereby the release moment transmission stops 58a and 58b have begun to disengage from one another. The position according to FIG. 11 is to be regarded as the representation of a moment which persists for only an infinitely short time, since the entraining and support tip 38 has already emerged from the support notch 42 and the strong spring 32 causes the opener lever 24, the support lever 36 and the coupling bolt 16 to descend suddenly. A further such representation of a moment is depicted in FIG. 12 where the release moment transmission stops 58a and 58b have already disengaged completely from one another, so that the release lever 44 has returned into the first operational position according to FIGS. 2 to 8.

Figure 12:
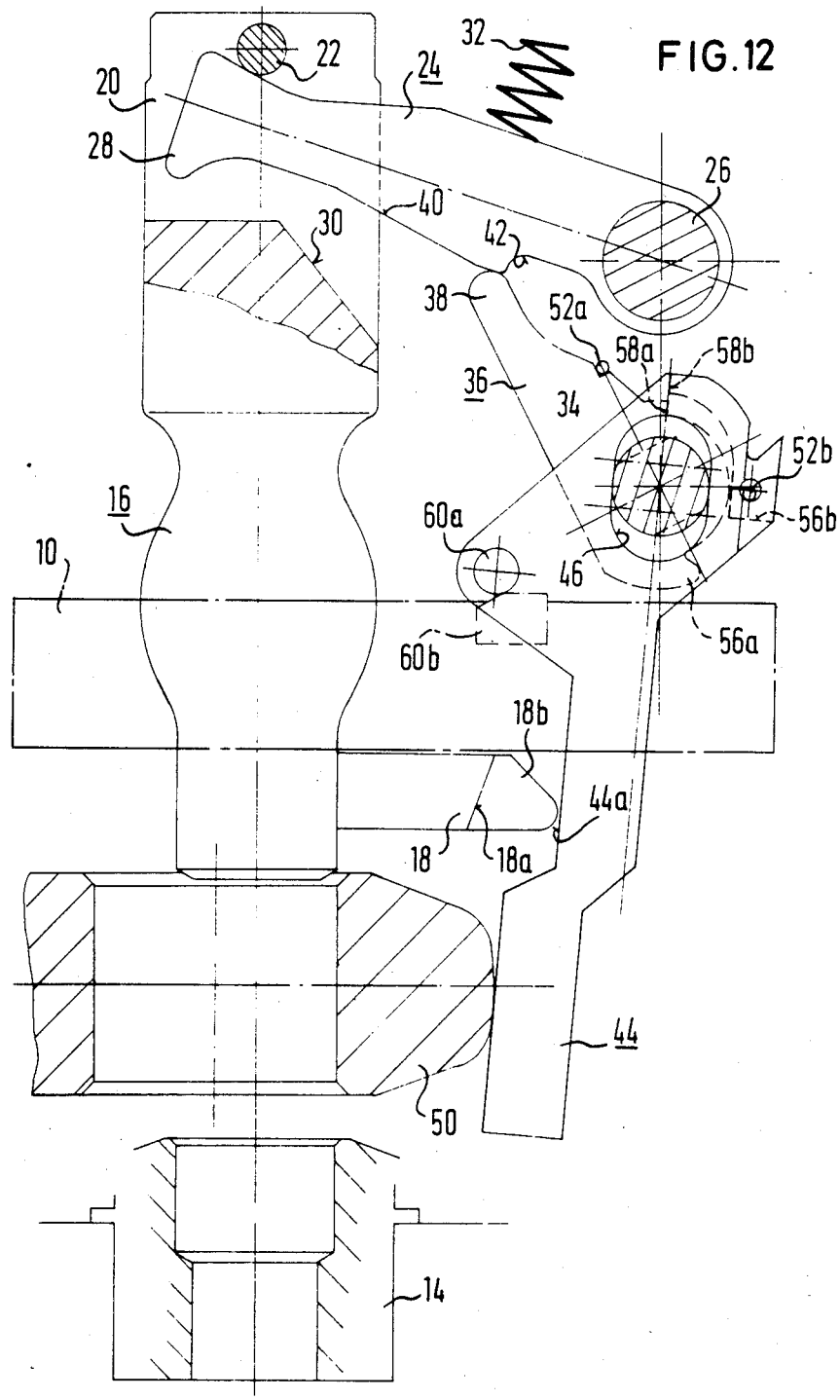
Figure 13:
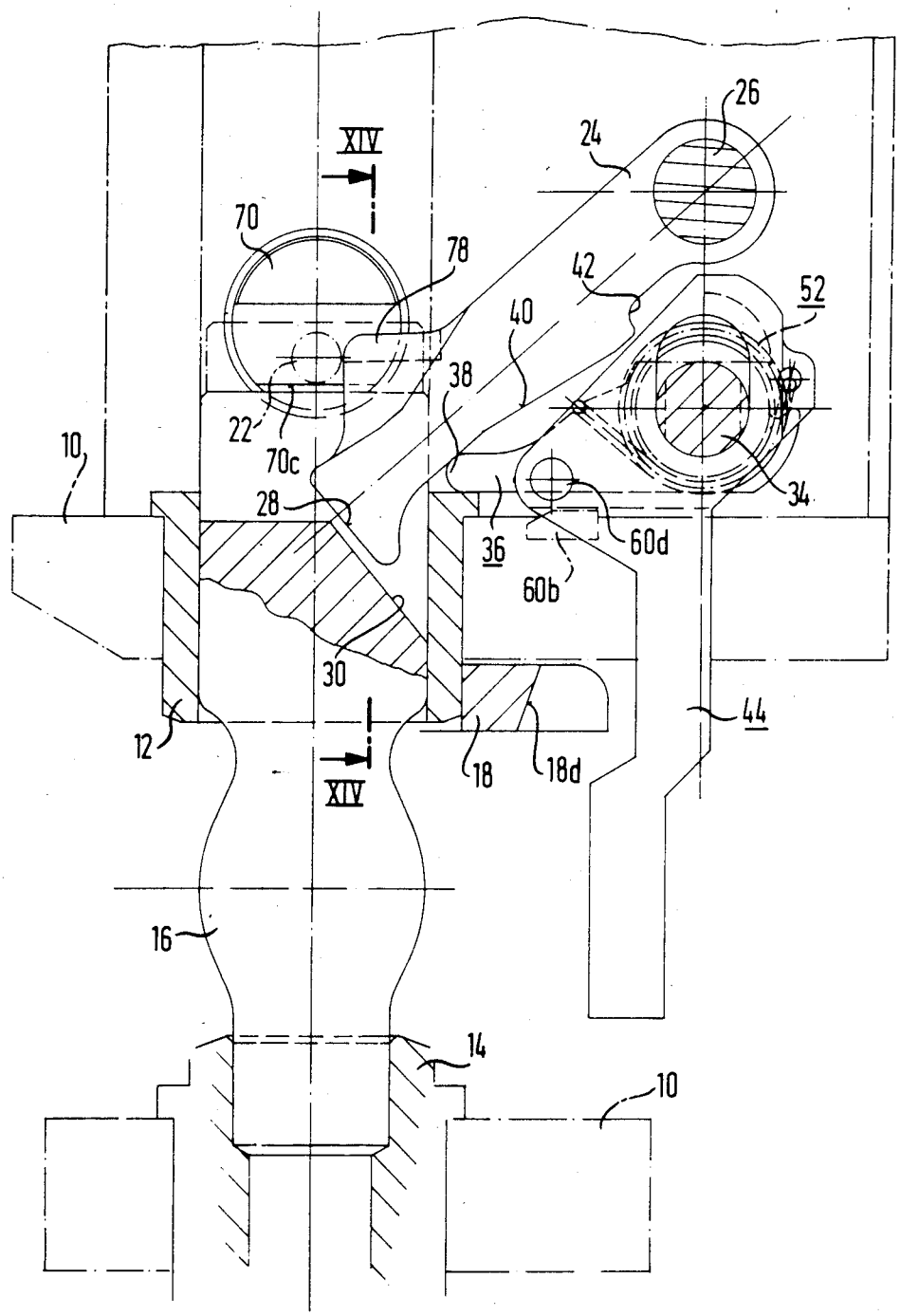
FIG. 13 represents a trailer coupling according to the invention in the coupling position, partially in section perpendicular to the opener lever pivot spindle.

In the further transition from FIG. 12 to FIG. 1 the entraining stop 56a strikes upon the entraining stop 56b and thus guides the release lever 44 back into the operational position according to FIG. 1, which is designated as the third operational position of the release lever.

In the solution according to the invention the space requirement is small in as much as the actuating shaft 34 lies below the opener lever pivot spindle 26. This means that the path of the free end of a manual actuating lever connected with the actuating shaft 34 approximates to the external contour of the coupling and thus can be made longer while filling the required free spaces.

It is further to be noted that with the solution in accordance with the invention favorable conditions are produced for minimizing the manual actuating force to be applied to the manual actuating lever. The manual actuating force, due to the co-operation of the support lever 36 with the opener lever 24, is made substantially less than if the opener lever were connected directly with the manual actuating lever through an opener lever pivot shaft.

In FIGS. 13 to 18 there is seen, further to the representation in FIGS. 1 to 12, an additional securing bolt 70. This is guided in the coupling body 10 for displacement in a direction parallel to the direction of the opener lever pivot spindle 26. A helical compression spring 72 initially stresses the securing bolt 70 into the securing position according to FIG. 14. For securing in rotation and if necessary for the limitation of the displaceability of the securing bolt 70 a peg 74 is provided which engages in a longitudinal groove 70a of the securing bolt.

The coupling bolt 16 has at its upper end a stepped slot 76 with a first, deeper, slot step 76a and a second, less deep, slot step 76b. As may be seen from FIG. 14, the second slot step 76b is open to the side. The first, deeper, slot step 76a lies centrally in relation to the vertical plane E—E which contains the axis of the coupling bolt 16 and is perpendicular to the opener lever pivot spindle 26. The first, deeper, slot step is bridged over at about half of its width by the entraining and holding peg 22. On the opener lever 24 there is formed an entraining and holding face 24a which is intended to cooperate with the entraining and holding peg 22.

In that part of the first slot step 76a which is not bridged over by the entraining and holding peg 22 there is formed on the opener lever 24 an elevation 78 which forms a disengaging cam for the additional securing bolt 70. The elevation 78 is formed for this purpose with a cam face 78a which stands opposite to an oblique face 70d of the securing bolt 70. The slot bottom 76ba of the second slot step 76b stands opposite to the lower edge 70c of the additional securing bolt 70, as may be seen from FIG. 14, when the coupling bolt is situated in the coupling position according to FIG. 13 in which it is secured against upward movement firstly by the opener lever 24 and also by the securing bolt 70. If for any reason the opener lever 24 were to lose its securing function, the coupling bolt 16 still could not wander out upwards, because the stop face formed by the slot bottom 76ba would strike against the lower edge 70c of the securing bolt.

Figure 15:
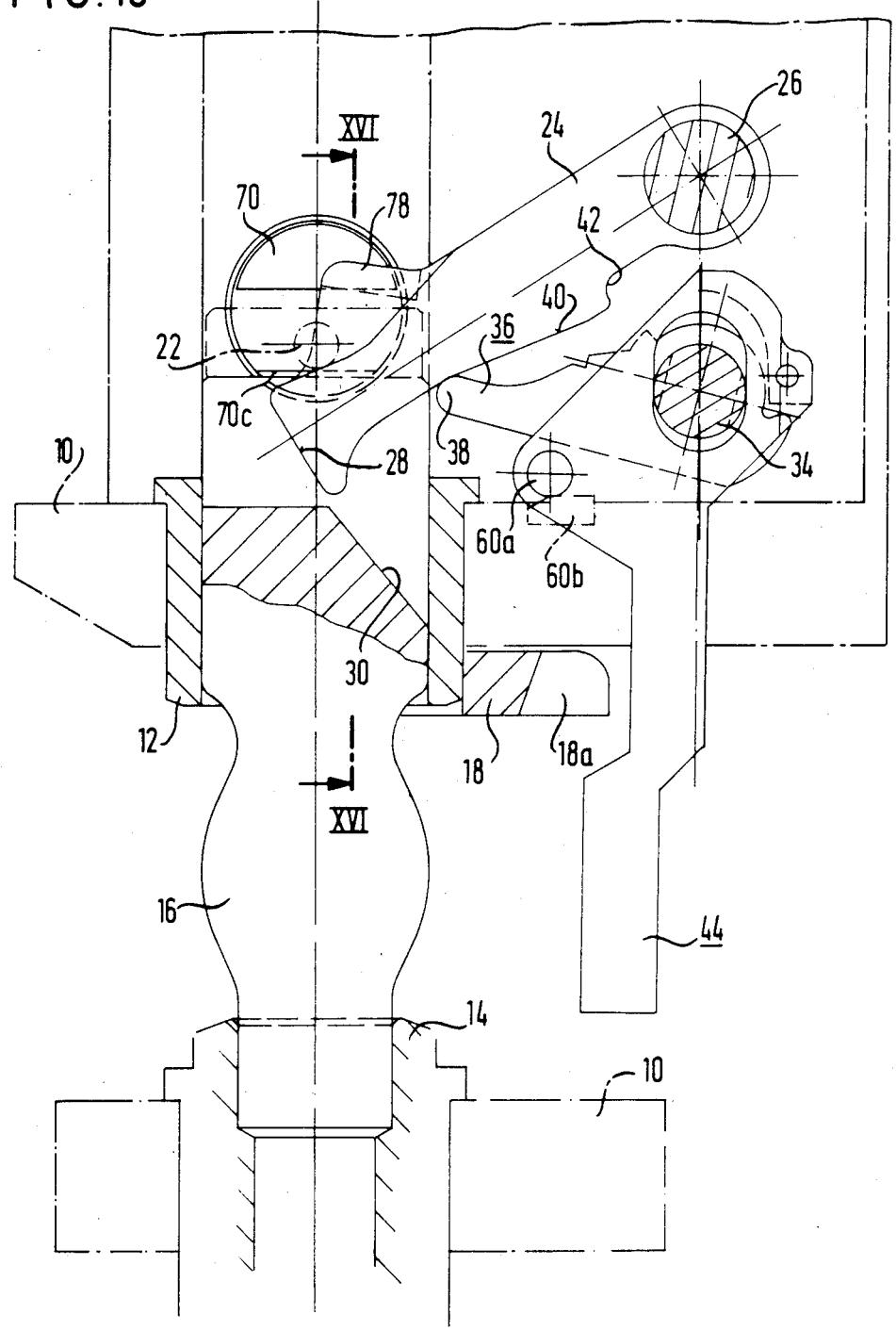
FIG. 15 represents a section corresponding to that of FIG. 13, in an intermediate position during the passage of the opener lever out of its securing position into its holding position.
Figure 16:
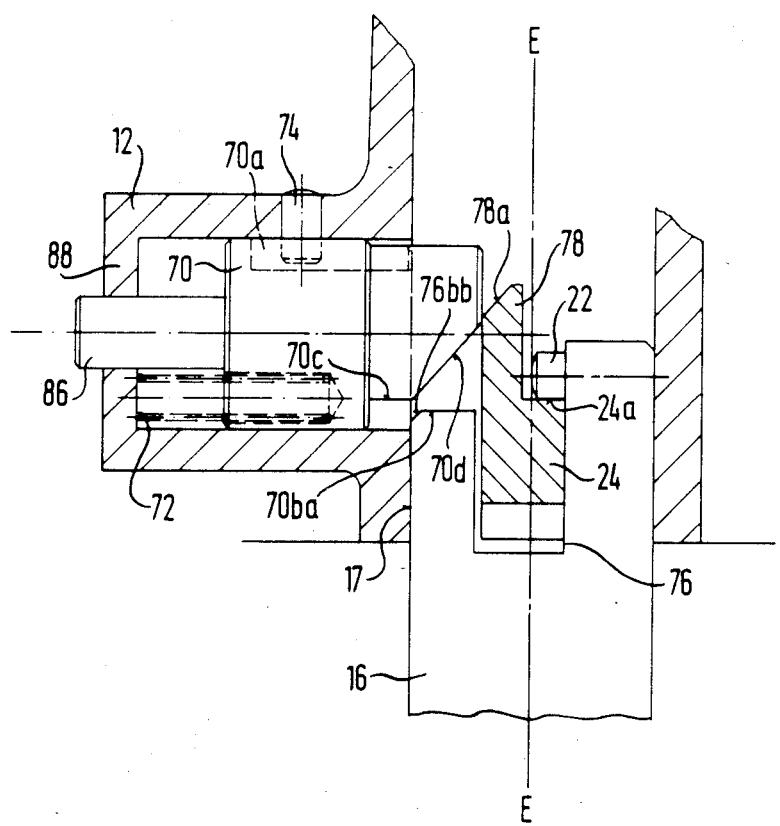
FIG. 16 represents a section along the line XVI—XVI in FIG. 15.
Figure 17:
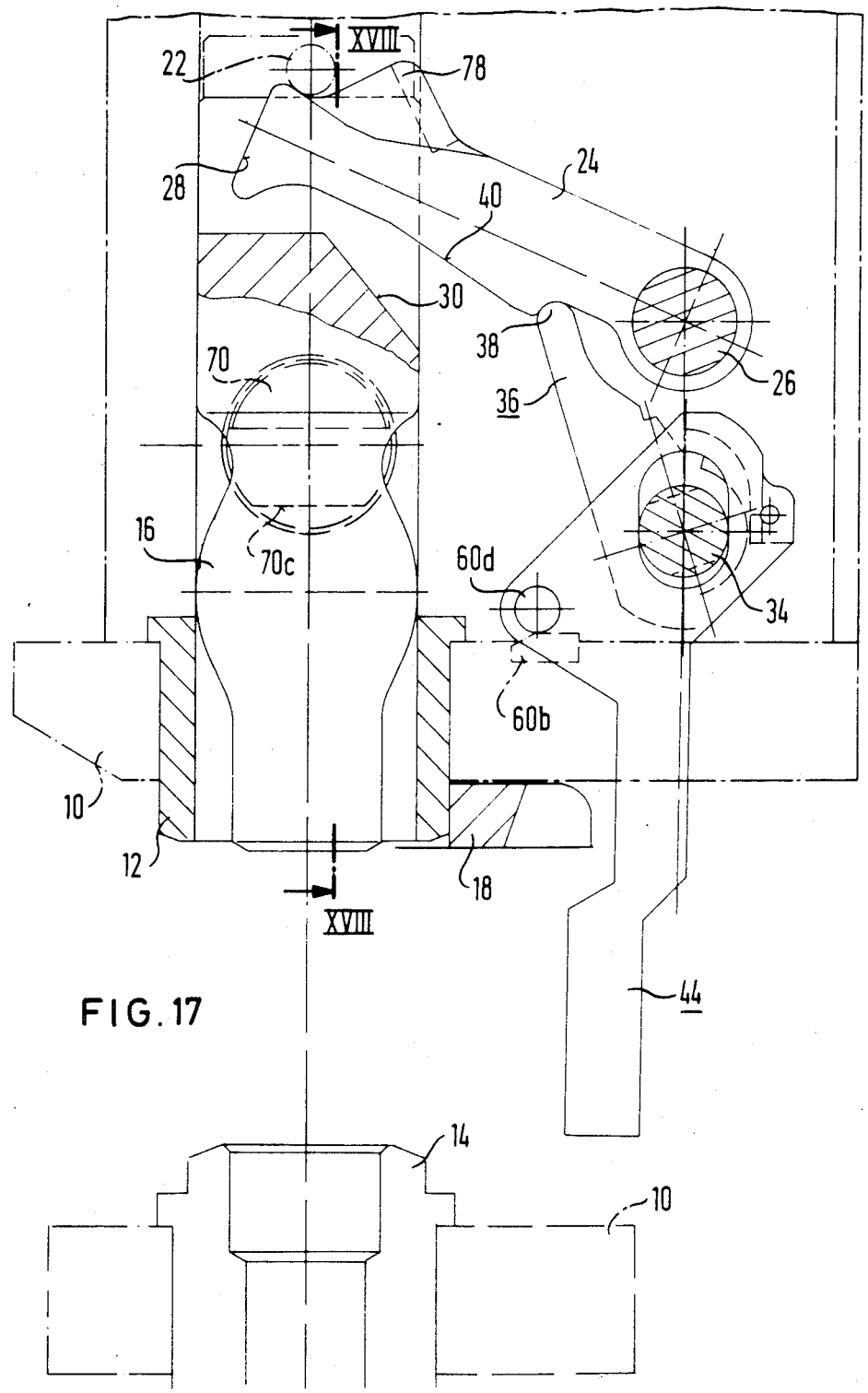
FIG. 17 represents a section corresponding to that of FIGS. 13 and 15 with the coupling bolt in the noncoupling position.
Figure 18:
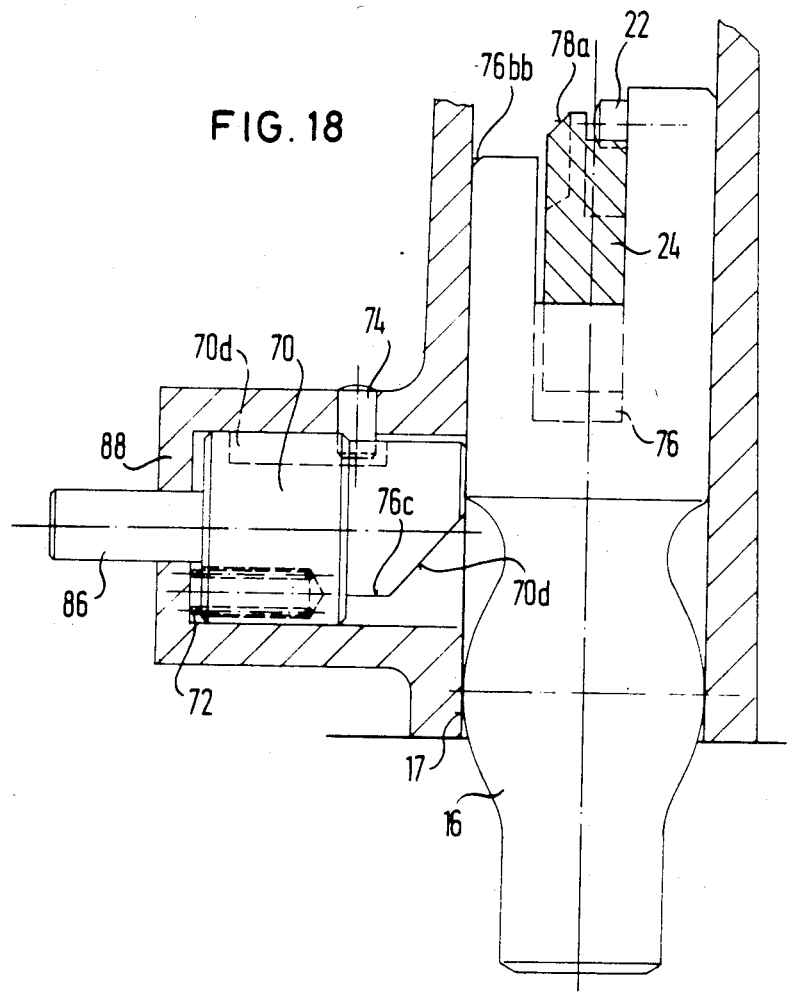
FIG. 18 represents a section along the line XVIII—XVIII in FIG. 17.

When the coupling bolt is to be lifted then as initially described the opener lever 24 is pivoted in the clockwise direction; in that action firstly the position according to FIG. 15 is reached in which the opener lever 24 abuts with an entraining and holding face 24a against the entraining and holding peg 22. However before this abutment comes about the cam face 78a runs up against the oblique face 70d, so that the securing bolt, as represented in FIG. 16, is displaced to the left by the cooperation of the cam face 78a and the oblique face 70d. In FIG. 16 the cam face 78a has already passed completely over the oblique face 70d and the securing bolt 70 is displaced to the left so far that the transition point between the lower edge 70c and the oblique face 70d has come back out of the guide bore 17 of the coupling bolt 16. When now the opener lever 24 is pivoted further upwards in the direction towards the holding position according to FIG. 17 and in this movement the opener lever 24, through the entraining and holding face 24a and the entraining and holding peg 22, entrains the coupling bolt 16 upwards, then a bevelled control face 76bb runs up against the oblique face 70d and the securing bolt 70 is displaced further to the left, according to the measure of the upward movement of the coupling bolt 16, into the position according to FIG. 18.

Figure 14:
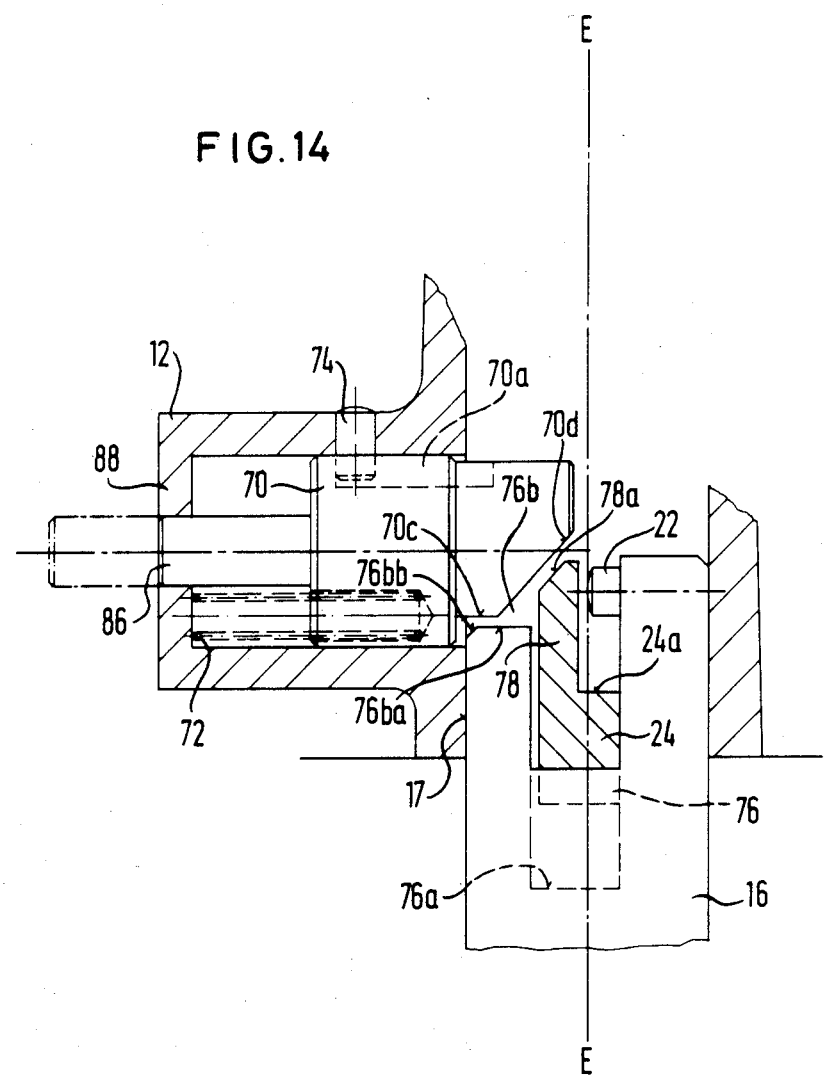
FIG. 14 represents a section along the line XIV—XIV in FIG. 13.

It should be heeded that the coupling bolt 16 runs with the stop face 76ba directly against the securing bolt 70, namely its lower edge 70c, and not merely by the intermediary of the opener lever 24. Therefore it is not possible for the coupling bolt 16 to disengage the additional securing bolt 70 through the agency of the opener lever 24. To this extent one can speak of mutually independent securing arrangements which are formed for the one part by the opener lever 24 (FIG. 13) and for the other by the stop face 76ba in cooperation with the lower edge 70c (FIG. 14).

Figure 19:
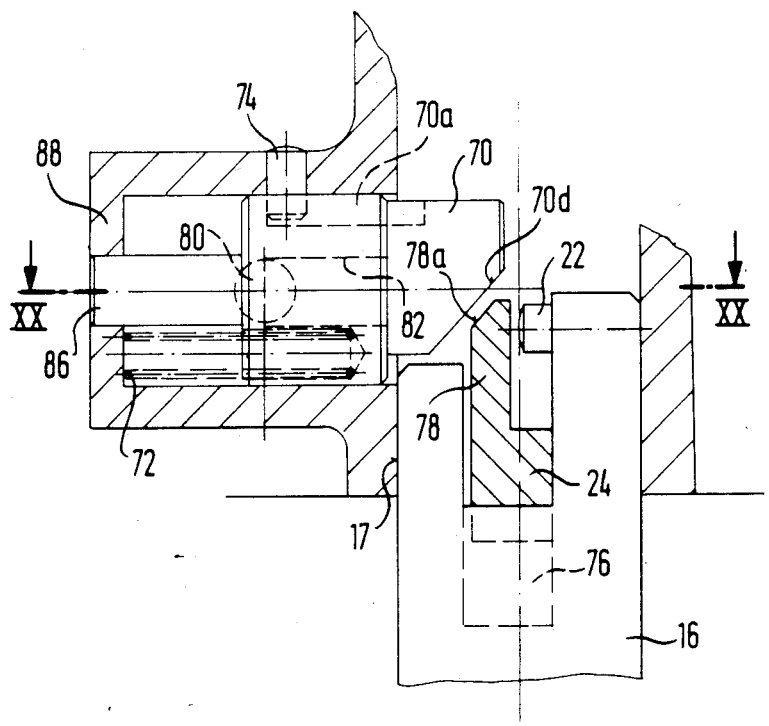
FIG. 19 represents a section corresponding to that of FIG. 14 with a position sensor for the additional securing bolt and FIG. 20 represents a section along the line XX—XX in FIG. 19.
Figure 20:
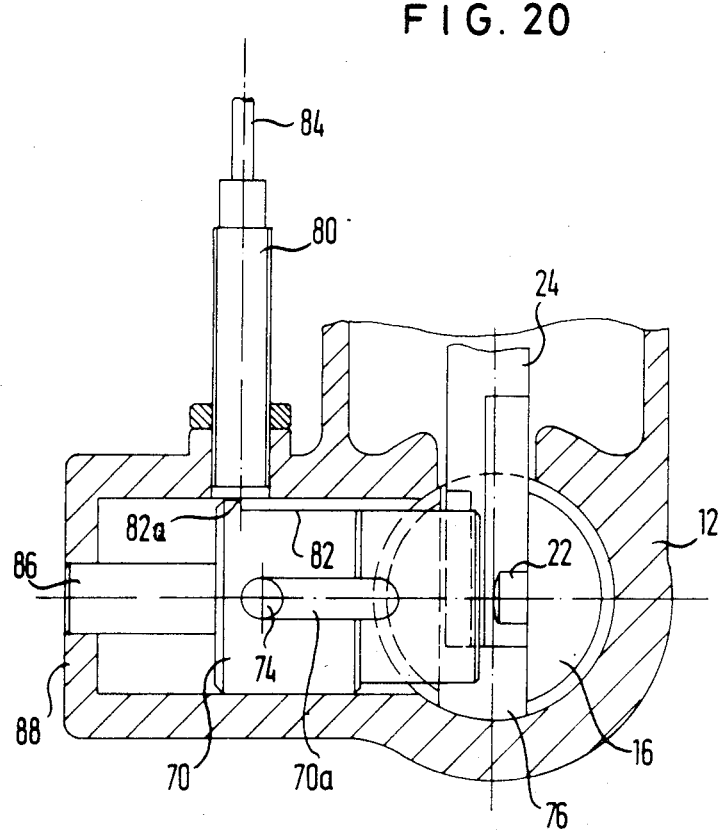

In FIGS. 19 and 20 there is seen a position sensor 80 which is controlled by one edge 82 of the additional securing bolt 70. In FIGS. 19 and 20 the additional securing bolt 70 is situated in its securing position. The existence of this securing position is effected by the inductively or capacitatively acting position sensor 80 in that nose 82a of the edge 82 stands opposite to the position sensor 80. From the position sensor 80 a signal lead 84 leads to the driving cabin and there delivers a signal to a signal emitter which shows that the coupling bolt is situated and secured in the coupling position.

On the additional securing bolt an indicator pin 86 is fitted which penetrates a wall 88 of the coupling body 10 and is flush with this wall only when the securing bolt 70 is situated in the securing position. If on the other hand it protrudes, the coupling is not yet satisfactorily closed and secured. Thus from the position of the indicator pin 86 it is possible to draw conclusions as to the state of securing of the coupling. The indicator pin 86 is in any case visible when the driver is situated at the position of the coupling.

I claim:

1. Trailer coupling comprising a coupling body (10), a coupling bolt (16) guided in the coupling body (10) for displacement between a coupling position and a noncoupling position, an opener lever (24) mounted for pivoting about an opener lever pivot spindle (26) between a securing position and a holding position and engaging in an aperture (76) of the coupling bolt (16), which opener lever (24) in a securing position secures the coupling bolt (16) in its coupling position, in its passage from the securing position into a holding position entrains the coupling bolt (16) out of the coupling position into the non-coupling position and in the holding position holds the coupling bolt (16) in the non-coupling position, an additional securing bolt (70) displaceable perpendicularly of the coupling bolt axis, which additional securing bolt (70) in a securing position stands opposite to an upwardly directed stop face (76ba) laterally on the coupling bolt (16) and secures the coupling bolt (16) in its coupling position, and a disengaging cam (78) for disengaging the additional securing bolt (70) out of its securing position, which disengaging cam (78) is connected with the opener lever 24 for common rotation and presses the additional securing bolt (70) at least partially out of its securing position before the coupling bolt (16), entrained by the opener lever (24) in the direction towards the non-coupling position, strikes against the additional securing bolt (70), characterized in that (a) the aperture (76) in the coupling bolt (16) is formed by an upwardly open stepped slot (76) with a first, more deeply cut, slot step (76a) substantially central of a middle plane perpendicular to the opener lever pivot spindle (26) and containing the axis of the coupling bolt (16) and a second, less deeply cut, laterally open, slot step (76b) on the side of this middle plane facing the additional securing bolt (70), the opener lever (24) being received in the first slot step (76a);

(b) the first slot step (76a) is traversed on a part of its width extending perpendicularly of the middle plane, namely on the side of the middle plane remote from the second slot step (76b), by an entraining and holding peg (22) on the upper end section of the coupling bolt (16), with which the opener lever (24) co-operates;

(c) the disengaging cam (78) is formed as an elevation of the opener lever (24) placed within the first slot step (76a) and at least partially below the upper end of the coupling bolt (16), limited to the region of the first slot step (76a) left free by the entraining and holding peg (78a), and (d) the slot bottom (76ba) of the second slot step (76b) forms the stop face to abut against the additional securing bolt (70).

2. Trailer coupling according to claim 1, characterized in that on the coupling bolt (16), beside the slot bottom (76ba) of the second slot step (76b), there is formed a control face (76bb) which comes together with the additional securing bolt (70) pressed by the disengaging cam (78) partially out of its securing position, especially with an oblique face (70d) of the additional securing bolt (70), and disengages the additional securing bolt (70) further according to the measure of the upward movement of the coupling bolt (16).

3. Trailer coupling according to one of claims 1 or 2, characterized in that with the additional securing bolt (70) there is associated a position sensor (80) which is connected with a coupling condition indicator.

4. Trailer coupling according to claim 3, characterized in that the position sensor (80) is an inductively acting position sensor.

5. Trailer coupling according to claim 1, characterized in that a support lever (36) is mounted pivotably about a support lever pivot spindle (34) placed parallel with and lower than the opener lever pivot spindle (26), in that the support lever (36) is rotatably connected to an actuating handle and in that the support lever (36) acts with an entraining and support tip (38) on an entraining edge (40) of the opener lever (24).

6. Trailer coupling according to claim 1, characterized in that said additional securing bolt (70) is displaceable in the direction extending generally parallel to the axial direction of said opener lever pivot spindle.

* * * * *